United States Patent [19]

Nagaishi et al.

[11] Patent Number: 4,458,529

[45] Date of Patent: Jul. 10, 1984

[54] HOT WIRE FLOW METER

[75] Inventors: Hatsuo Nagaishi, Yokosuka; Toyoaki Nakagawa, Yokohama, both of Japan

[73] Assignee: Nissan Motor Company, Limited, Kanagawa, Japan

[21] Appl. No.: 305,348

[22] Filed: Sep. 23, 1981

Related U.S. Application Data

[63] Continuation-in-part of Ser. No. 128,875, Mar. 10, 1980, abandoned.

[30] Foreign Application Priority Data

Mar. 16, 1979 [JP] Japan .................................. 54-30662

[51] Int. Cl.³ .............................................. G01F 1/68
[52] U.S. Cl. ...................................... 73/204; 73/118.2
[58] Field of Search ...................... 73/118, 204, 861.22

[56] References Cited

U.S. PATENT DOCUMENTS

| | | | |
|---|---|---|---|
| 3,824,966 | 7/1974 | Schneider et al. | |
| 3,864,972 | 2/1975 | Burgess et al. | 73/861.22 |
| 3,982,434 | 9/1976 | McMurtrie | 73/861.22 |
| 4,089,214 | 5/1978 | Egami et al. | 73/116 |
| 4,196,622 | 4/1980 | Peter | 73/204 |
| 4,213,335 | 7/1980 | Peter et al. | 73/204 |
| 4,276,773 | 7/1981 | Kawai et al. | 73/204 |

FOREIGN PATENT DOCUMENTS

| | | |
|---|---|---|
| 1109953 | 6/1961 | Fed. Rep. of Germany . |
| 1935938 | 1/1970 | Fed. Rep. of Germany . |
| 2444511 | 4/1976 | Fed. Rep. of Germany . |
| 2610336 | 9/1976 | Fed. Rep. of Germany . |

Primary Examiner—Charles A. Ruehl
Attorney, Agent, or Firm—Lowe, King, Price & Becker

[57] ABSTRACT

A hot wire flow apparatus for generating a flow rate signal indicative of the actual flow rate of a pulsating fluid flow. The apparatus utilizes a wire element connected with a temperature compensating circuit to generate a flow rate signal indicative of the pulsating fluid flow, but lower in value than the equivalent steady state flow rate. A correction circuit is provided to receive the flow rate signal and generate a corrected flow rate signal indicative of the actual flow rate of the pulsating fluid.

15 Claims, 13 Drawing Figures

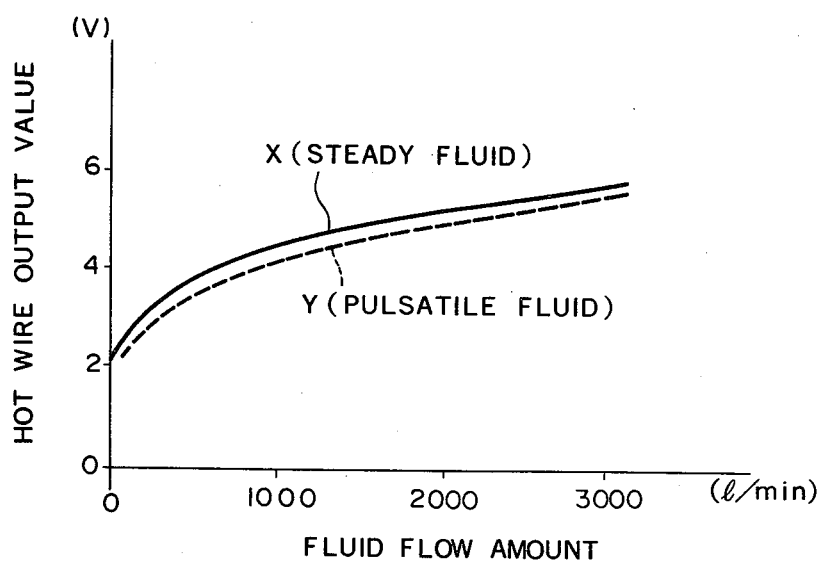
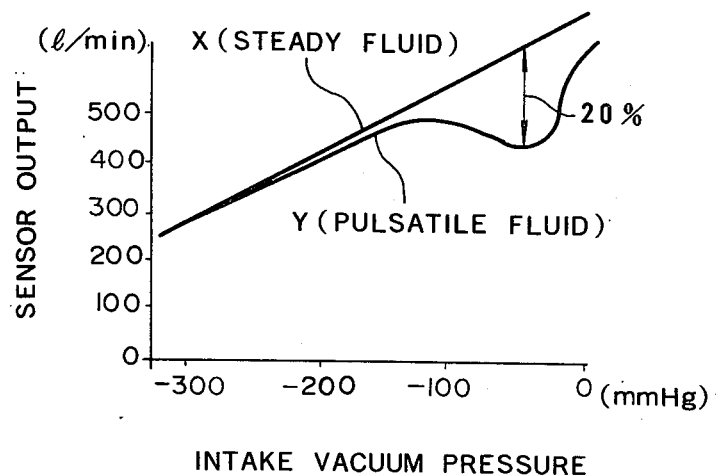

$D = -(B-C)$   $E = -D \times 0.25$   $F = A + E$

HOT WIRE FLOW METER

CROSS REFERENCE TO THE RELATED APPLICATION

The present application is a continuation-in-part application of the co-pending U.S. patent application Ser. No. 128,875, filed Mar. 10, 1980, entitled HOT WIRE FLOW METER, which is now abandoned.

BACKGROUND OF THE INVENTION

The present invention relates generally to a hot wire flow meter for measuring fluid amount and velocity in use with an electrically conductive hot wire which has a variable electric resistance depending on the temperature thereof. More particularly, the invention relates to a hot wire flow meter adapted for measuring fluid flow rates generally in the form of fluid pulses.

In internal combustion engines, reciprocating pump, diaphragm pump and so forth are utilized, and it is necessary to measure or determine flow rate of fluid flowing through fluid flow passages. For measuring the fluid flow rate in the internal combustion engine itself and through the reciprocating pumps, diaphragms and so forth, various fluid flow meters are utilized. Conventionally, mechanical fluid flow meters such as that using a potentiometer have contained various drawbacks and disadvantages with respect to durability, resistance against vibration, high cost and so on. Furthermore, in cases of the fluid flow meters using a potentiometer, the response characteristics of such fluid flow meters with respect to variation of the flow amount and flow velocity is relatively low due to hysterisis within the potentiometer.

A hot wire flow meter is therefore considered as being useful for measurement of the fluid amount. The hot wire flow meter output has a non-linear response charactertistic with respect to variation of the flow amount or velocity of the fluid but can follow such variation with good response time.

Therefore, the hot wire flow meter has been widely used for measuring fluid amount or velocity flowing through the fluid passage. In the prior art, the measured flow amount of the fluid in the conventional hot wire flow meter is apt to be smaller than the actual flow amount. Particularly, for measuring the flow amount of a pulsating fluid, the difference of the measured value and the actual value becomes substantial in comparison with the measurement of the steady flow, as shown in FIG. 1. In FIG. 1, the broken line Y represents the measured flow amount of the pulsating fluid indicated by the output voltage of the conventional hot wire flow meter. As apparent from FIG. 1, the output Y of the hot wire flow meter is lower than that corresponding to the actual flow amount as represented by the solid line X. In case that the hot wire flow meter is applied for measuring an intake air flow rate in the air intake passage of the internal combustion engine for indicating an engine control parameter in the electronic engine control system, such difference between the output value of the hot wire flow meter and the value corresponding to the actual flow amount may adversely influence the control operation of the engine. FIG. 2 shows a graph of the intake air flow rate as measured by the hot wire flow meter. In FIG. 2, the line X represents the output value of the hot wire flow meter with respect to the measured intake vacuum, assuming the flow in the air induction passage is a steady flow. The line X is compared with the line Y which is representative of the hot wire flow meter output in measurement of the pulsating fluid flow. As apparent from FIG. 2, in a vacuum pressure range of approximately $-50$ mmHg, the difference between the output values in measurement of steady fluid flow and in measurement of pulsating fluid flow becomes 20%. This difference may affect engine control operation of the electronic engine control system.

SUMMARY OF THE INVENTION

Therefore, it is an object of the present invention to provide a hot wire flow meter which is capable of preventing an adverse influence due to the pulsation of the fluid flow to be measured. Yet another object of the invention is to provide a temperature compensation circuit for maintaining the output flow rate signal of the hot wire sensor independent of the temperature of the fluid being measured.

Another and more specific object of the present invention is to provide a hot wire flow meter including a means for correcting the output value of the hot wire flow meter for linearizing the output value to increase the accuracy of the measured value.

To accomplish the above-mentioned and other objects there is provided a hot wire flow meter, according to the present invention, having means for correcting the output value thereof. The correction means includes a peak holding circuit for holding the peak value of the waveform output from the hot wire. The peak holding circuit produces a correction signal for correcting the waveform signal from the hot wire or produces a corrected signal of the waveform signal which can be used as the hot wire flow meter output.

BRIEF DESCRIPTION OF THE DRAWINGS

The present invention will be illustrated more fully by way of examples with reference to the accompanying drawings, in which:

FIG. 1 is a view showing characteristic curves of flow rate vs. output developed by a hot wire flow meter for a steady flow and a pulsating flow respectively;

FIG. 2 is a view showing variation characteristics of vacuum pressure in an intake passage for an internal combustion engine of an automobile vs. output developed by a hot wire flow meter for a steady flow and a pulsating flow respectively;

DESCRIPTION OF THE PREFERRED EMBODIMENT

Figure 3:
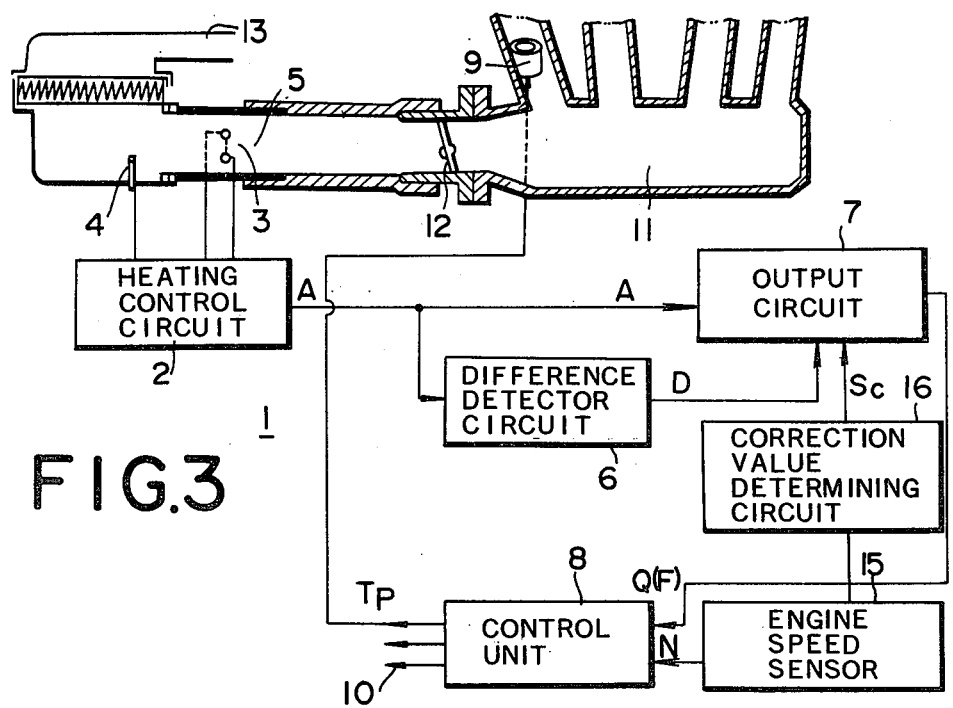
FIG. 3 is a block diagram showing the first embodiment in accordance with the present invention.

Referring to FIG. 3, there is illustrated a preferred embodiment of an air flow meter 1 incorporated in an electronic engine control system for an internal combustion engine. It should be appreciated that, although the disclosure herebelow is directed to the intake air flow meter for measuring the intake air flow rate flowing through the air intake passage of the internal combustion engine, the invention can be embodied otherwise for application to a reciprocating pump, diaphragm pump and so forth.

In the shown embodiment of FIG. 3, a control unit 8 of the electronic engine control system is adapted to control a fuel injection for the internal combustion engine. The internal combustion engine has a fuel injector 9 for injecting fuel into a combustion chamber, and an intake manifold 11 of the air induction system of the engine for supplying air thereto. An intake air flow rate flowing through the intake manifold 11 is controlled by a throttle valve 12 and/or auxiliary or idle air control valve (not shown) disposed within an air intake passage 5 upstream of the intake manifold 11. The air intake passage 5 incorporates an air cleaner 13 for cleaning the intake air flowing therethrough. The control unit 8 may, for example, receive an air flow meter signal Q fed from the air flow meter and an engine speed signal N fed from an engine speed sensor 15. The fuel injection amount signal $T_p$ is generally determined based on the air flow sensor meter signal Q representative of the measured air flow rate and the engine speed signal N of the engine speed sensor. The control unit 8 produces a control signal $T_p$ to be fed to the fuel injector 9 for controlling the ratio of the open period to the close period of the fuel injection valve of the fuel injector 9.

For measuring the intake air flow rate, a hot wire 3 is disposed within the air intake passage 5 downstream of the air cleaner 13. The hot wire 3 has a variable resistance value depending on the temperature thereof. The hot wire 3 is connected to a heating control circuit 2 which acts as temperature compensation circuit for compensating for the variation of the hot wire temperature depending on the intake air temperature. For enabling the heating control circuit 2 to compensate for a temperature drop due to the intake air temperature, a temperature sensor 4 is disposed within the air intake passage 5 between the air cleaner 13 and the hot wire 3. The temperature sensor 4 measures the intake air temperature and provides an input signal indicative of same to the heating control circuit 2. The hot wire 3 and temperature sensor 4 are selected to have similar electrical resistance vs. temperature characteristics, and both may, for example, have positive temperature coefficients. In response to the temperature sensor signal, the heating control circuit 2 controls the power supply to the hot wire 3 so that the temperature difference between the hot wire and intake air is maintained at a constant value.

Figure 5:
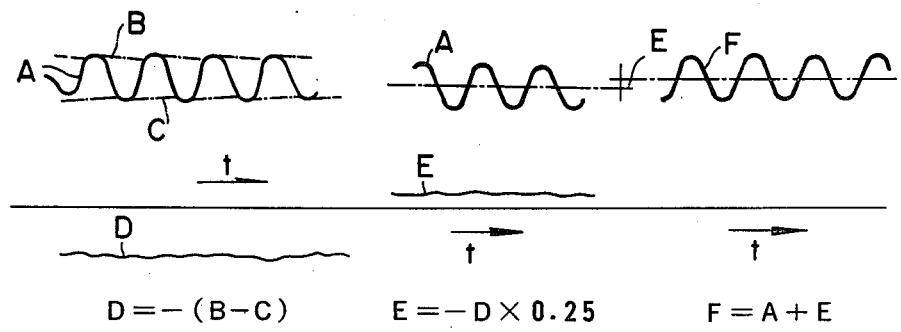
FIG. 5 is a view showing waveforms at various points in FIG. 4.

The heating control circuit 2 outputs a waveform signal A, the amplitude of which corresponds to the pulsating intake air flow rate flowing through the air intake passage, as illustrated in FIG. 5. Since the heating control circuit 2 compensate the signal value produced by the hot wire 3 with a intake air temperature factor, the amplitude of the waveform signal A exactly corresponds to the flow amount of the intake air.

The waveform signal A of the hot wire 3 is fed to a difference detector circuit 6. The difference detector circuit 6 detects upper peak elements and lower peak elements of the waveform signal fed from the hot wire 3. The difference detector circuit 6 produces a difference signal D representative of the difference of the value between the upper peak elements and lower peak elements of the waveform signal A, as represented by curve D in FIG. 5. The difference signal D of the difference detector circuit 6 is fed to an output circuit 7. Based on the signal D from the difference detector circuit 6, the output circuit 7 produces a correction signal E representative of the correction value of the signal value of the waveform signal A which is directly inputted from the hot wire 3 thereto. The correction signal is used to correct the waveform signal A to take into account the pulsating nature of the fluid flow to make it correspond to the steady state value. With the waveform signal A and the correction signal E, the output circuit 7 produces an output signal F serving as air flow sensor signal Q in FIG. 3. The output signal F serving as the flow sensor signal Q is fed to the controller 8.

If a relatively thick wire is used as the hot wire 3, the response characteristic of the air flow meter becomes relatively lower than that required. Due to relatively low responsiveness, the variation of the air flow meter signal Q(F) can not follow the variation of the air flow rate which itself depends on the engine speed. Therefore it is preferable to correct the value of the air flow meter signal F by a correction value based on the engine speed. The output circuit 7 is thus connected with the engine speed sensor 15 via a correction value determining circuit 16. The correction value determining circuit 16 determines the correction value based on the engine speed represented by the engine speed signal N and produces a correction signal $S_c$ to be fed to the output circuit 7. The output circuit 7 corrects the signal value of the air flow meter signal Q(F) by the correction value indicated in the correction signal $S_c$.

The correction value determined by the correction value determining circuit 16 is a function of the engine speed signal N and the correction coefficient is determined corresponding to the wire to be used as the hot wire.

By providing the correction value determining circuit 16, it becomes possible to use relatively thick wire which makes it possible to prevent a surge factor from the air flow meter output which may arise in a relatively low load condition of the engine where there is a large amount of air flow in the air intake passage.

Figure 4:
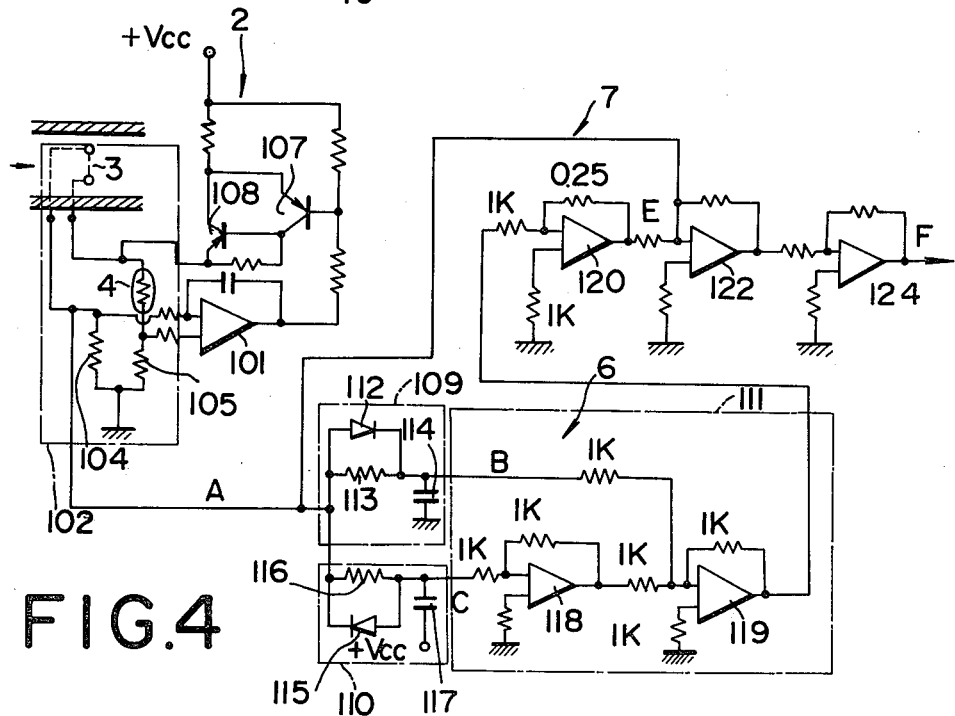
FIG. 4 is an electric circuit diagram of a first embodiment of the present invention.

FIG. 4 shows a circuit diagram of the first embodiment of the air flow meter for determining the intake air flow rate. In the shown embodiment, the hot wire 3 is connected in series with a thermistor type temperature sensor 4 for measuring the intake air temperature. The hot wire 3 is connected with one input terminal of an amplifier 101. In turn, the temperature sensor 4 is also connected with the other input terminal of the amplifier 101. The hot wire 3 and the temperature sensor 4 form a Wheatstone bridge circuit 102 with resistors 104 and 105. Both the hot wire 3 and thermistor 4 are positioned in the air flow path and both have similar resistance vs. temperature characteristics, e.g. similar positive temperature coefficients. The amplifier 101 and transistors 107 and 108 control the electric current applied to the Wheatstone bridge circuit 102 to keep the relationship in the resistance value of respective resistors constant. The resistors 104 to 105, the amplifier 101 and the transistors 107 and 108 constitute the heating control circuit 2 for controlling the temperature of the hot wire 3 so that the temperature difference between the hot wire 3 and the intake air can be compensated in order to avoid the influence of the intake air temperature factor to the output value thereof.

In practice, the hot wire 3 is kept at a temperature above the intake air temperature at a predetermined, fixed value selected in the range of approximately 120 degree centigrade to 200 degree centigrade.

The difference detector circuit 6 is connected with the heating control circuit 2 for receiving therefrom the waveform signal A. The difference detector circuit 6 comprises an upper peak holding circuit 109, a lower peak holding circuit 110 and a subtracting circuit 111. The upper peak holding circuit 109 includes a diode 112, the anode of which is connected to the hot wire 3, a resistor 113 connected to the hot wire 3 in parallel to the diode 112, and a capacitor 114. The upper peak holding circuit 109 establishes the upper peak of the waveform signal A fed from the hot wire 3 by charging capacitor 114 and produces an upper peak signal which is represented by curve B in FIG. 5. Likewise, the lower peak holding circuit 110 comprises a diode 115, a resistor 116 and a capacitor 117. The cathode of the diode 115 is connected to the hot wire 3 and the resistor 116 is connected to the hot wire in parallel to the diode. The lower peak holding circuit 110 establishes the lower peak of the waveform signal A and produces a lower peak signal represented by curve C in FIG. 5, by charging the capacitor 117. The subtracting circuit 111 comprises differential amplifiers 118 and 119. The differential amplifiers 118 and 119 serves for subtracting the signal value of the lower peak signal C from the signal value of the upper peak signal B to produce the difference signal D.

The difference signal D is fed to the output circuit 7. The output circuit 7 includes amplifier 120 in which the signal level of the difference signal D is dropped to one fourth. An amplifier 122 receives the output of the amplifier 120 and the waveform signal A. The amplifier 122 serves as adder together with an amplifier 124 to add the output of the amplifier 120 and the waveform signal A to correct the hot wire output to produce the corrected signal F. The signal F is then fed to the control unit 8 which may contain a filter circuit to smooth the signal to derive the overage value thereof.

It should be noted that the correction value obtained by multiplying the differential signal value by a predetermined value is made to correct for the tendency of the hot wire flow meter to otherwise measure a value of pulsating air flow less than that measured in the steady flow case. In practice, the correction value, i.e., one fourth of the difference signal value is selected based on emperical data. Namely, the correction value to be added to the waveform signal A corresponds to the deviation between X and Y in FIG. 1.

Figure 6:
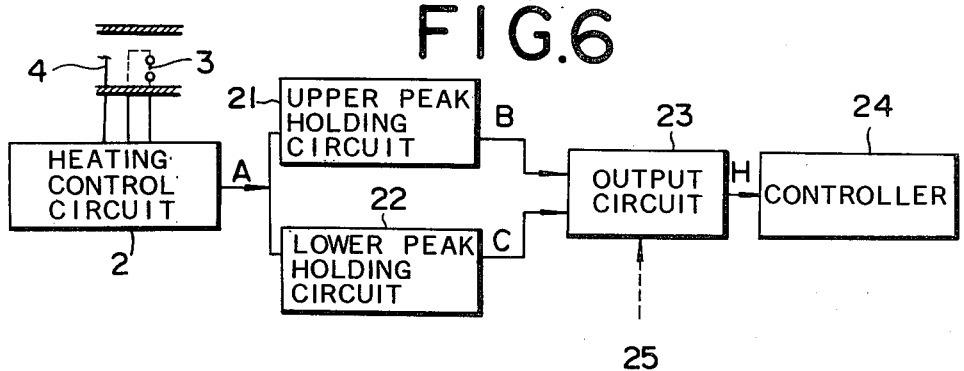
FIG. 6 is a block diagram showing a second embodiment of the present invention.
Figure 8:
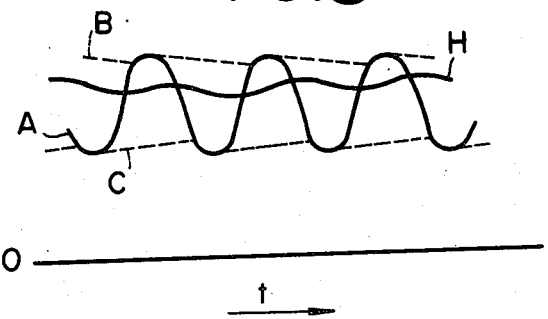
FIG. 8 is a view showing waveforms in FIG. 7.

Referring to FIG. 6, there is illustrated another embodiment of the air flow meter according to the present invention. As apparent herefrom, the circuit of the air flow meter of this embodiment is more simplified than the foregoing first embodiment. Likewise to the foregoing first embodiment, the hot wire 3 is disposed within the air intake passage 5 and is connected to the heating control circuit 2. The heating control circuit 2 functions similar to that in the first embodiment for maintaining the temperature difference between the hot wire and the intake air at a constant value. The heating control circuit 2 is connected with the upper peak holding circuit 21 and the lower peak holding circuit 22 for producing upper and lower peak signals B and C. From the upper and lower peak signals B and C, the output circuit 23 produce a corrected signal represented by H in FIG. 8. The signal H modified in the output circuit 23 is fed to the controller 24.

Figure 7:
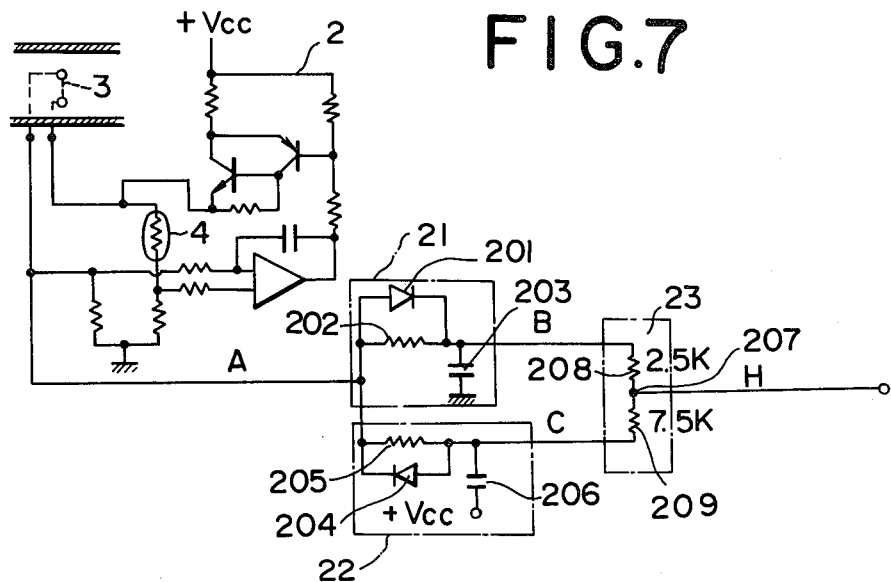
FIG. 7 is an electric circuit diagram of the second embodiment of the present invention.

FIG. 7 shows in more greater detail the circuit construction of the embodiment of FIG. 6 of the air flow meter in the electronic engine control system. As seen from FIG. 7, the construction of the Wheatstone bridge circuit in the heating control circuit 2 is substantially identical with that of the foregoing first embodiment. Likewise to the first embodiment, the difference detector circuit 3 includes the upper peak holding circuit 21 comprising diode 201, a resistor 202 and capacitor 203, and the lower peak holding circuit 22 comprising a diode 204, a resistor 205 and a capacitor 206. The diode 201 of the upper peak holding circuit 21 is connected to the hot wire 3 with the anode thereof and adapted to measure the upper peak of the waveform signal A from the hot wire 3. The signal produced by the upper peak holding circuit 21 is as represented by broken line B in FIG. 8. Similarly, the cathode of the diode 204 in the lower peak holding circuit 22 is connected to the hot wire 3 to measure the lower peak of the waveform signal A. The lower peak holding circuit 22 is thus produces a signal as represented by a broken line C in FIG. 8.

Both of the upper and lower peak holding circuits 21 and 22 are connected to an output terminal 207 via resistors 208 and 209 which serve as the output circuit 23. In the shown embodiment, the resistor 208 has the resistance value of 2.5 KΩ and the resistor 209 has the resistance value of 7.5 KΩ. Therefore, the potential H at the output terminal 207 becomes 75% of the difference of the upper and lower peak. This value is also practically and experimentally determined.

Figure 9:
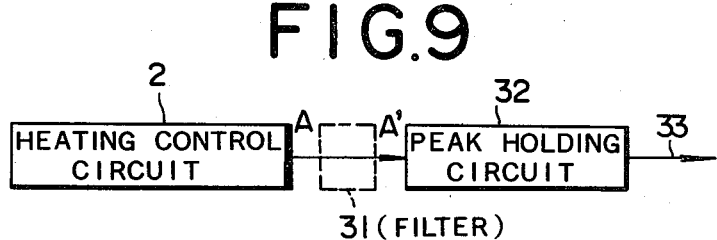
FIG. 9 is a block diagram showing the third embodiment of the present invention.
Figure 10:
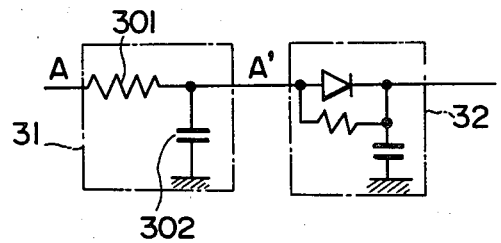
FIG. 10 is an electric circuit diagram of a portion of the third embodiment of the present invention.
Figure 11:
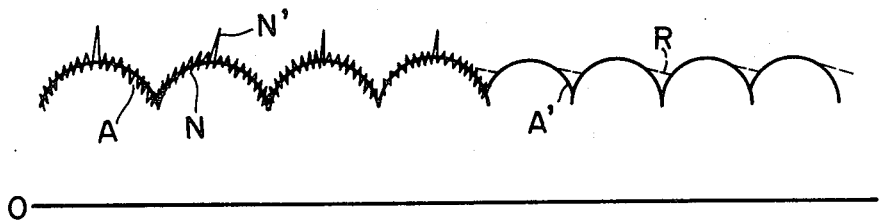
FIG. 11 is a view showing waveforms in FIG. 10.

In case that a relatively thin wire is used, a filter is preferably interpositioned between the heating control circuit 2 and the difference detector circuit 6 (FIG. 3) in order to avoid the influence of surge current otherwise caused by relatively high response characteristics of the wire. FIG. 9 shows a schematic block diagram of another embodiment of the hot wire flow meter including a filter 31 which is interpositioned between the heating control circuit 2 and the peak holding circuit 32. As shown in FIG. 10, the filter 31 comprises a resistor 301 and a capacitor 302 in order to eliminate noise elements in the waveform signal A, such as noise produced by ignition and/or by surge of the intake air flow to smooth the waveform signal as represented by A′ in FIG. 11. The smoothed waveform signal A′ is inputted to the peak holding circuit 32.

Figure 12:
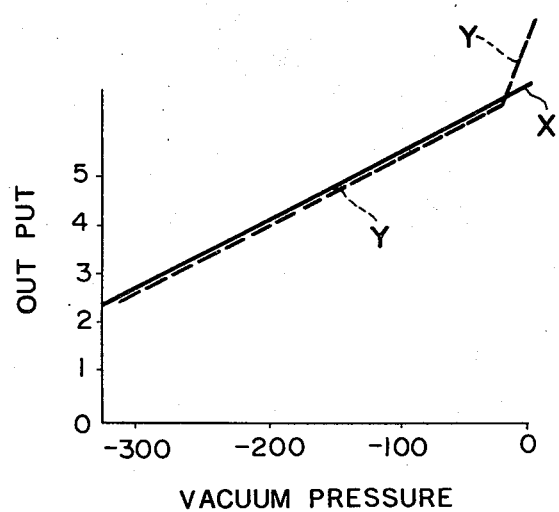
FIG. 12 is a view showing that the output for a pulsating flow in accordance with the present invention approaches the output which is developed for a steady flow.
Figure 13:
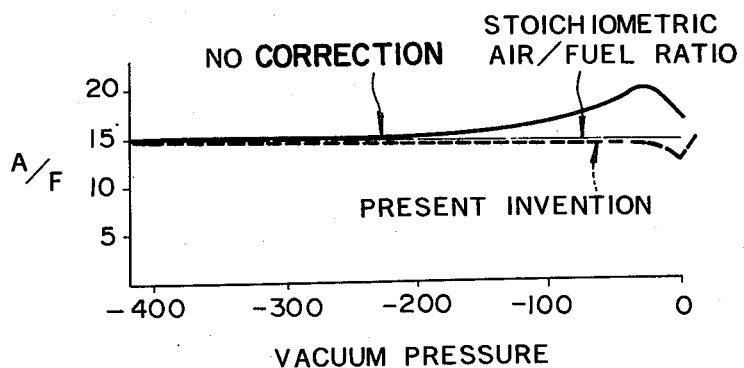
FIG. 13 is a view showing that the air/fuel ratio can be controlled in accordance with the present invention so as to approach the stoichiometric air/fuel ratio.

FIG. 12 shows the response characteristics of the air flow meter according to the present invention in comparison with that of the steady fluid flow value which is illustrated by the solid line X. As seen from FIG. 12, the output value of the air flow meter of the present invention becomes linear as represented by line Y. In accordance with the corrected air flow meter value, the fuel injection amount can be controlled so that the air/fuel ratio becomes closer to the stoichiometric value, as represented by phantom line in FIG. 13.

What is claimed is:

1. A hot wire flow meter for generating a signal indicative of the flow rate of a pulsating fluid flow comprising:
   (a) a wire element positioned in a fluid flow path of said fluid, said wire element having an electrical resistance indicative of the temperature thereof;
   (b) temperature sensor means positioned in said fluid flow path for generating a temperature signal indicative of the temperature of said fluid;
   (c) first circuit means for passing an electric current through said wire element and generating a flow rate signal corresponding to said pulsating fluid flow, said first circuit means responsive to the temperature signal for maintaining the magnitude of said flow rate signal substantially independent of the temperature of said fluid; and
   (d) second circuit means responsive to the flow rate signal generated by said first circuit means for correcting a flow rate signal error by producing an error signal corresponding in value to the difference between the pulsating fluid flow rate and a hypothetical steady state fluid flow rate, and combining the fluid flow rate signal with the error signal to generate a corrected flow rate signal indicative of the actual flow rate of said pulsating fluid.

2. A hot wire flow apparatus as recited in claim 1 wherein said second circuit means comprises a peak holding means and means for producing said error signal in response to a peak value of said flow rate signal.

3. A hot wire flow meter as recited in claim 2 wherein said peak holding means comprises an upper peak holding circuit providing an upper peak value of said flow rate signal.

4. A hot wire flow meter as recited in claim 3 wherein said peak holding means comprises a lower peak holding circuit providing a lower peak value of said flow rate signal.

5. A hot wire flow meter as recited in claim 1 further including a filter circuit connected between said first and second circuit means for removing noise components from said flow rate signal.

6. A hot wire flow meter for generating a signal indicative of the flow rate of a pulsating fluid flow comprising:
   (a) a wire element positioned in a fluid flow path of said fluid, said wire element having an electrical resistance indicative of the temperature thereof;
   (b) temperature sensor means positioned in said fluid flow path for generating a temperature signal indicative of the temperature of said fluid;
   (c) first circuit means for passing an electric current through said wire element and generating a flow rate signal corresponding to said pulsating fluid flow, said first circuit means responsive to the temperature signal for maintaining the magnitude of said flow rate signal substantially independent of the temperature of said fluid; and
   (d) second circuit means responsive to said first circuit means to receive said flow rate signal for generating a corrected flow rate signal indicative of the actual flow rate of said pulsating fluid, said second circuit means having a peak holding means including an upper peak holding circuit providing an upper peak value of said flow rate signal and a lower peak holding circuit providing a lower peak value of said flow rate signal, said second circuit means being responsive to the magnitude of the difference between said upper and lower peak values.

7. A control system for an internal combustion engine having a hot wire flow meter for generating a signal indicative of the flow rate of a pulsating air flow to said engine, said system comprising:
   (a) a wire element positioned in an air flow path of said engine, said wire element having an electrical resistance indicative of the temperature thereof,
   (b) temperature sensor means positioned in said air flow path for generating a temperature signal indicative of the temperature of said fluid,
   (c) first circuit means for passing an electric current through said wire element and generating a flow rate signal corresponding to said pulsating air flow, said first circuit means including temperature compensating means responsive to the temperature signal for maintaining the magnitude of said flow rate signal substantially independent of the temperature of fluid,
   (d) second circuit means responsive to said flow rate signal for generating a corrected flow rate signal indicative of the actual flow rate of said pulsating air flow, said second circuit means including a peak holding means for correcting said flow rate signal in response to a peak value of said flow rate signal, and
   (e) fuel control means connected to receive said corrected flow rate signal for controlling the quantity of fuel injected into said engine.

8. A hot wire flow meter as recited in claim 7 wherein said peak holding means comprises an upper peak holding circuit providing an upper peak value of said flow rate signal.

9. A hot wire flow meter as recited in claim 8 wherein said peak holding means comprises a lower peak holding circuit providing a lower peak value of said flow rate signal.

10. A hot wire flow meter as recited in claim 9 wherein said second circuit means is responsive to the magnitude of the difference between said upper and lower peak values.

11. A hot wire flow meter as recited in claim 7 further including a filter circuit connected between said first and second circuit means for removing noise components from said flow rate signal.

12. A hot wire flow meter for generating a signal indicative of the flow rate of a pulsating fluid flow, comprising:
   a wire element positioned in a fluid flow path of said fluid, said wire element having an electrical resistance indicative of the temperature thereof;
   temperature sensor means positioned in said fluid flow path for generating a temperature signal indicative of the temperature of said fluid;
   first circuit means for passing an electric current through said wire element and generating a flow rate signal corresponding to said pulsating fluid flow, said first circuit means responsive to the temperature signal for maintaining the magnitude of said flow rate signal substantially independent of the temperature of said fluid; and
   second circuit means connected to receive the flow rate signal for generating a corrected flow rate signal, said second circuit means including means for detecting upper and lower peak values of the flow rate signal and responsive to the difference between said upper and lower peak values to correct said flow rate signal.

13. A hot wire flow meter for generating a signal indicative of the flow rate of a pulsating fluid flow, comprising:
a wire element positioned in a fluid flow path of said fluid, said wire element having an electrical resistance indicative of the temperature thereof;
temperature sensor means positioned in said fluid flow path for generating a temperature signal indicative of the temperature of said fluid;
first circuit means for passing an electric current through said wire element and generating a flow rate signal corresponding to said pulsating fluid flow, said first circuit means responsive to the temperature signal for maintaining the magnitude of said flow rate signal substantially independent of the temperature of said fluid; and
second circuit means connected to receive the flow rate signal for generating a corrected flow rate signal, wherein said second circuit means comprises a peak holding means for correcting said flow rate signal in response to a peak value of said flow rate signal.

14. A hot wire flow meter as recited in claim 13, wherein said peak holding means comprises an upper peak holding circuit providing an upper peak value of said flow rate signal, and a lower peak holding circuit providing a lower peak value of said flow rate signal.

15. A method of generating a signal indicative of the fluid flow rate of a pulsating fluid flow, comprising the steps of:
positioning a wire element in a fluid flow path of said fluid, said wire element having an electrical resistance indicative of the temperature thereof;
positioning a temperature sensor means in said fluid path for generating a temperature signal indicative of the temperature of said fluid;
supplying an electric current for said wire element and compensating the temperature variation of said wire element based on said temperature signal so as to maintain the magnitude of said flow rate signal substantially independent of the temperature of the fluid;
detecting upper and lower peak values of said flow rate signal;
obtaining a difference between the magnitudes of the upper and lower peak values; and, in response,
producing a corrected flow rate signal indicative of the actual flow rate of said pulsating fluid.

* * * * *